United States Patent [19]

Bevilacqua et al.

[11] 4,440,717

[45] Apr. 3, 1984

[54] HEATED JUNCTION THERMOCOUPLE LEVEL MEASUREMENT APPARATUS

[75] Inventors: Frank Bevilacqua, Windsor; Joseph M. Burger, Granby, both of Conn.

[73] Assignee: Combustion Engineering, Inc., Windsor, Conn.

[21] Appl. No.: 298,436

[22] Filed: Sep. 1, 1981

[51] Int. Cl.³ .................. G21C 17/00; G01F 23/72
[52] U.S. Cl. .......................... 376/247; 376/258; 73/295
[58] Field of Search ............... 376/247, 258; 73/295

[56] References Cited

U.S. PATENT DOCUMENTS

| | | | |
|---|---|---|---|
| 2,279,043 | 4/1942 | Harrington | 73/295 |
| 3,205,709 | 9/1965 | Gearing et al. | 73/295 |
| 3,279,252 | 10/1966 | Barlow | 73/295 |
| 3,280,627 | 10/1966 | Cousins et al. | 73/295 |
| 3,360,990 | 1/1968 | Greene et al. | 73/295 |
| 3,500,687 | 3/1970 | Smith | 73/295 |
| 3,905,243 | 9/1975 | Goldfuss | 73/295 |
| 3,964,311 | 6/1976 | Holmen | 73/295 |
| 4,320,656 | 3/1982 | Tiskus | 73/295 |

FOREIGN PATENT DOCUMENTS

| | | | |
|---|---|---|---|
| 1959041 | 5/1971 | Fed. Rep. of Germany | 73/295 |
| 2728582 | 1/1978 | Fed. Rep. of Germany | 73/295 |
| 820219 | 2/1961 | United Kingdom | 73/295 |
| 2022844 | 12/1979 | United Kingdom | 73/295 |

*Primary Examiner*—Sal Canglialosi
*Attorney, Agent, or Firm*—David L. Smith; William W. Habelt

[57] ABSTRACT

A liquid level sensing apparatus (32) senses the level of liquid surrounding the apparatus. A plurality of axially spaced sensors (36) are enclosed in a separator tube (86). The separator tube (86) tends to collapse the level of a two-phase fluid within the separator tube into essentially a liquid phase and a gaseous phase where the collapsed level bears a relationship to the coolant inventory outside the separator tube. The level of the liquid phase is sensed by level sensing apparatus (32). The separator tube (86) contains inlet-outlet ports (90,92) near the top and bottom thereof to equalize the liquid level inside and outside the separator tube (86) when the level fluctuates or the water within the separator tube (86) flashes to steam. Each sensor (36) is comprised of a heater (64), a heated thermocouple junction (68) and an unheated thermocouple junction (66) within an elongated heat conductive housing (62). The heated portion of housing (62) is enclosed in a splash guard (72) with inlet-outlet ports (78,82) near the top and bottom to equalize the liquid level inside and outside the splash guard (72) and to eliminate the spurious indications of liquid level change which may arise if water droplets contact the housing (62) in the region of the heater. To prevent steam bubbles entrained in a two-phase fluid cross flow from entering the lateral inlet-outlet ports (90,92) of the separator tube (86), the separator tube (86) is enclosed in support tube (100) which may in turn be enclosed in an otherwise unused control element assembly shroud (110). The lateral inlet-outlet ports (90,92) of separator tube (86) are axially offset from lateral inlet-outlet ports (102) of support tube 100 at least where support tube 100 is subjected to cross flow. The shroud (110) is open on the bottom and has lateral inlet-outlet ports (112) to facilitate liquid level fluctuations to equalize inside and outside shroud (110). An alternate embodiment permits the measurement of more than one liquid level.

9 Claims, 6 Drawing Figures

HEATED JUNCTION THERMOCOUPLE LEVEL MEASUREMENT APPARATUS

BACKGROUND OF THE INVENTION

This invention relates to the sensing of liquid levels within a vessel and, in particular, to the sensing of the level of a fluid coolant above the core in a nuclear reactor vessel.

When a nuclear reactor starts up from a cold start, the reactor vessel is completely filled with a fluid coolant such as subcooled water. During operation of the nuclear reactor, the fluid coolant is forced through the core to remove the heat generated therein. During normal operaton of a pressurized water reactor, the fluid coolant is subcooled and remains in a liquid state as it passes through the core. During abnormal operation of a pressurized water reactor due to a loss of pressure, the fluid coolant within the reactor vessel may change state to become a two-phase fluid mixture of water and steam. Due to the buoyancy of steam, the water in the volume above the core is particularly susceptible to being displaced by the two-phase fluid. The two-phase fluid in the reactor vessel head may be stagnant or turbulent two-phase flow. The two-phase fluid forms due to a decrease in pressure that results in a portion of the water flashing to steam. The difficulty of measuring the level of coolant above the core is more complex with a two-phase fluid than with a subcooled fluid. A level sensing device must be able to sense the level of liquid coolant regardless of whether the coolant is a subcooled liquid or a two-phase fluid.

Prior art instrumentation such as heated thermocouples and differential pressure sensors have provided an ambiguous and sometimes indirect indication coolant inventory above the core. An accurate indication of coolant inventory above the core is an important indication of the core cooling conditions. An accurate indication of the coolant inventory above the core would provide a sound basis for operators to insure appropriate actions are taken to prevent the coolant level from dropping below the top of the core.

Therefore, a need exists for an apparatus to provide a direct and accurate indication of the inventory of fluid coolant above the core in nuclear reactor vessels during abnormal operation as well as during normal operation. Such an apparatus would be useful in recognition of low reactor coolant levels and inadequate core cooling.

SUMMARY OF THE INVENTION

The present invention overcomes the disadvantages of the prior art by providing a direct and accurate indication of the coolant inventory above the core in a nuclear reactor vessel.

The present invention also has several additional desirable features. Redundancy in the level measurement is provided in that two identical level measurement systems are utilized with the electrical signals generated by the redundant measurement systems processed by electrically separate channels of a microprocessor based control system. Furthermore, the present invention has no moving parts, no external piping, requires no in-containment electrons and can be retrofitted into existing reactors or reactors under construction.

The heated junction thermocouple level measurement system utilizes the difference in heat transfer characteristics between heat transfer to a liquid and heat transfer to a gas or vapor to determine if liquid coolant is present above the core at the level of each sensor. The sensors are located in the upper guide structure of the reactor vessel. Signal processing equipment and display equipment are located outside containment.

The heated junction thermocouple level measurement system has eight sensors. Each sensor has a heated thermocouple junction, an unheated thermocouple junction and a heater coil within the same housing; a portion of the housing is enclosed in a splash guard. The heated and unheated thermocouple of each sensor are physically displaced so that heat from the heater coil does not effect the voltage generated by the unheated thermocouple. The heated and unheated thermocouples are wired to provide the absolute temperature of both the thermocouple junctions as well as the differential termperature between the thermocouple junctions. With the unheated junction in the same housing as the heated junction, no additional temperature or pressure compensation is required.

When liquid coolant surrounds the housing in the region of both the heated thermocouple and the unheated thermocouple, the temperature of both thermocouples will remain essentially identical as heat produced by the heater coil is transferred from the heater coil through the housing to the surrounding liquid coolant. Since the voltage produced by the heated thermocouple junction opposes the voltage produced by the unheated thermocouple junction, the net voltage output is small when liquid coolant surrounds both the heated thermocouple junction and the unheated thermocouple junction.

In the absence of liquid coolant surrounding the housing in the region of the heated thermocouple junction, the heat produced by the heater coil does not transfer as well to the surrounding gaseous coolant causing the heated thermocouple junction temperature to rise above the unheated thermocouple junction temperature and a much larger net voltage output results. This condition indicates the liquid coolant level is below the heated thermocouple junction. A heater controller prevents the heated junction thermocouple from becoming excessively hot by ramping back the voltage to the heater coil when the uncovered heated thermocouple junction temperature reaches some pre-established limit.

A portion of each housing is enclosed in a splash guard to prevent liquid coolant from splashing on the housing in the region of the heater coil or running down the housing because liquid splashing on the housing or running down the housing in the region of the heater coil causes temperature fluctuations. By eliminating spurious temperature fluctuations of the heated thermocouple junction a more accurate indication of liquid coolant level is achieved. The splash guard also acts as a stilling chamber. The splash guard has inlet-outlet ports near the top and near the bottom thereof to maintain fluid communication with the exterior of the splash guard. The top inlet-outlet ports in the splash guard are above the heated thermocouple junction and preferably beyond the heater coil. The bottom inlet-outlet ports in the splash guard are below the heated junction thermocouple and preferably beyond the heater coil.

A plurality of sensors are vertically spaced in the reactor vessel above the core to give a coolant level indication over the entire height above the core. The vertical spacing is such that an incremental level indication is obtained with eight sensors spanning the approximately 15 feet from the reactor vessel head to the fuel alignment plate.

The plurality of sensors are enclosed in a separator tube. The separator tube serves to collapse the level of two-phase fluid by separating the two-phase fluid into essentially a liquid phase and a vapor phase. It is this liquid level which is measured by the heated junction thermocouple level measurement system. The separator tube also acts as a stilling chamber. The bottom surface of the separator tube is enclosed to prevent rising bubbles of steam from passing through the separator tube and disturbing the liquid-vapor interface thereby giving a false indication of level. The separator tube has lateral inlet-outlet ports near the top and near the bottom thereof to maintain fluid communication between the interior of the separator tube and the coolant above the core and to permit liquid level changes to equalize inside and outside the separator tube. The lateral inlet-outlet ports are sized to permit rapid equalization of liquid level changes when water inside the separator tube flashes to steam due to a loss of pressure within the reactor vessel. The lateral inlet-outlet ports are sized based on a theoretical worst condition rate of decrease in the pressure and water level in the reactor vessel.

The heated junction thermocouple level measurement system is mounted above the core near the outlet nozzle. The heated junction thermocouple level measurement system is subjected to cross flow as the coolant exits from the reactor vessel. To prevent steam bubbles entrained in a two-phase fluid cross flow from entering the lateral inlet-outlet ports of the separator tube, the separator tube is enclosed in a support tube. The support tube has lateral inlet-outlet ports throughout the length thereof to permit liquid level fluxuations to equalize inside and outside the support tube. The lateral inlet-outlet ports of the separator tube are axially offset from the lateral inlet-outlet ports of the support tube at least where crossflow exists.

In some applications the support tube may be located in an otherwise unused control element assembly shroud. The control element assembly shroud has openings which permit liquid level fluxuations to equalize inside and outside the control element assembly shroud. The lateral inlet-outlet ports of the control element assembly shroud may be axially offset from the lateral inlet-outlet ports of the support tube.

Redundant level monitoring is achieved by using more than one heated junction thermocouple level measurement system. Each heated junction thermocouple level measurement system is mounted in the reactor vessel above the core. Each heated junction thermocouple level measurement system has eight heated junction thermocouples. Associated with each heated thermocouple junction and within the same housing as the heated thermocouple junction are a heater coil and an unheated thermocouple junction. The electrical signals generated by the heated and unheated thermocouple junctions are processed by electrically independent microprocessor channels.

The output voltages of each heated junction thermocouple level measurement system are processed by electrically independent channels of a microprocessor based control system. Each channel of the microprocessor based control system has two heater coil power controllers. The control system provides operator access to all thermocouple temperatures on a digital display, an output signal for trend recording the output of each of the thermocouple temperatures, test features for performing diagnostics, alarm outputs to the plant anunciator system, temperature outputs for calculating the subcooled margin and control of the heater coil power for each of the heater coils.

DESCRIPTION OF THE PREFERRED EMBODIMENT

Figure 1:
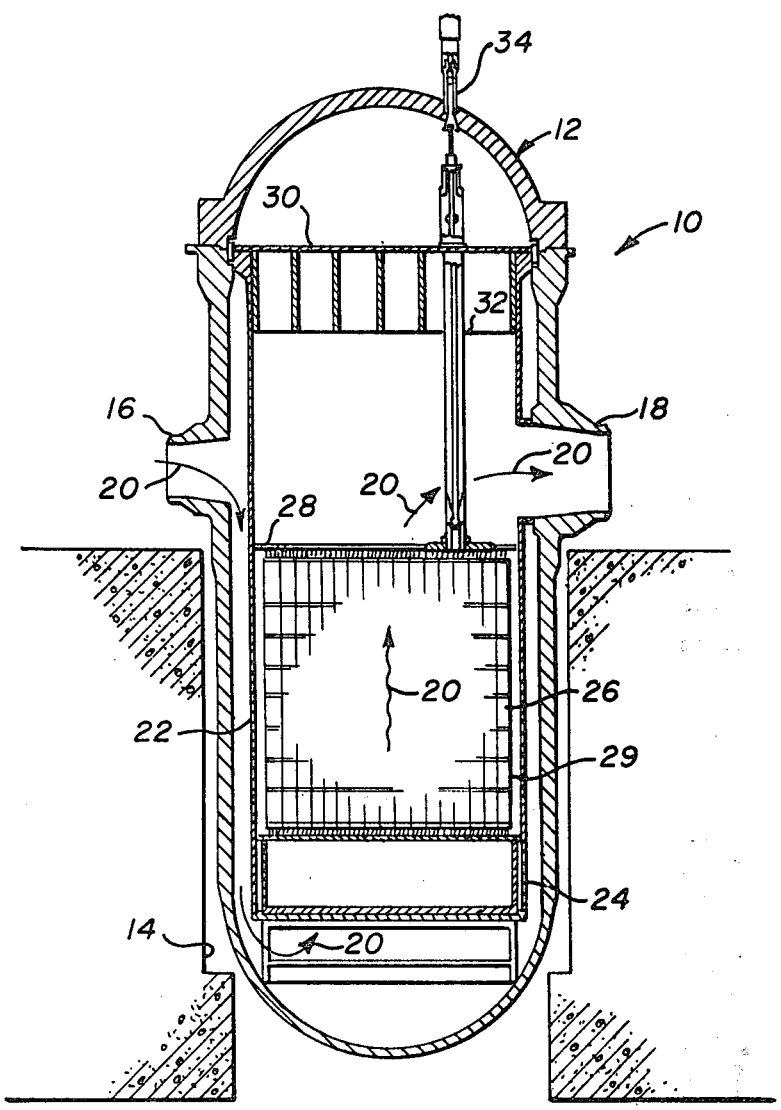
FIG. 1 is a vertical section through a nuclear reactor of the type embodying the present invention.

FIG. 1 shows a nuclear reactor vessel 10 and reactor vessel closure head 12 vertically disposed in a concrete reactor cavity 14. Reactor vessel 10 is connected to the other components of the nuclear steam supply system (not shown) by a reactor coolant inlet nozzle 16 and outlet nozzle 18.

Prior to start-up of the reactor, the entire volume within reactor vessel 10 is filled with a fluid coolant such as water. During normal reactor operation, the liquid coolant enters reactor vessel 10 through inlet nozzle 16, follows flowpath 20 down the outside of core support barrel 22, up through core support assembly 24 through fuel assemblies 26, collectively core 29, to remove heat generated therein, through fuel alignment plate 28 and exits from reactor vessel 10 through outlet nozzle 18. A small portion of the flow through core 29 passes up through shroud 110 into the plenum beneath reactor vessel closure head 12.

Reactor vessel 10 coolant inventory may be affected by changes in the state of the coolant or by changes in the quantity of inventory in the reactor coolant system. Reactor vessel 10 coolant inventory may be decreased by a loss of reactor coolant system fluid due to a break in the system. Reactor vessel 10 coolant inventory may also be decreased by contraction due to system cooling as caused by a break in a steam line. Reactor vessel 10 coolant inventory may also be decreased due to displacement of water by noncondensables or steam as the result of flashing.

The coolant inventory above fuel alignment plate 28 is available for cooling core 29 should one of the above incidents cause a decrease in reactor vessel 10 coolant inventory. Heated junction thermocouple level measurement system 32 monitors the liquid level in reactor 10 above fuel alignment plate 28. This liquid level represents the portion of total volume above fuel alignment plate 28 that is occupied by liquid coolant.

Figure 2:
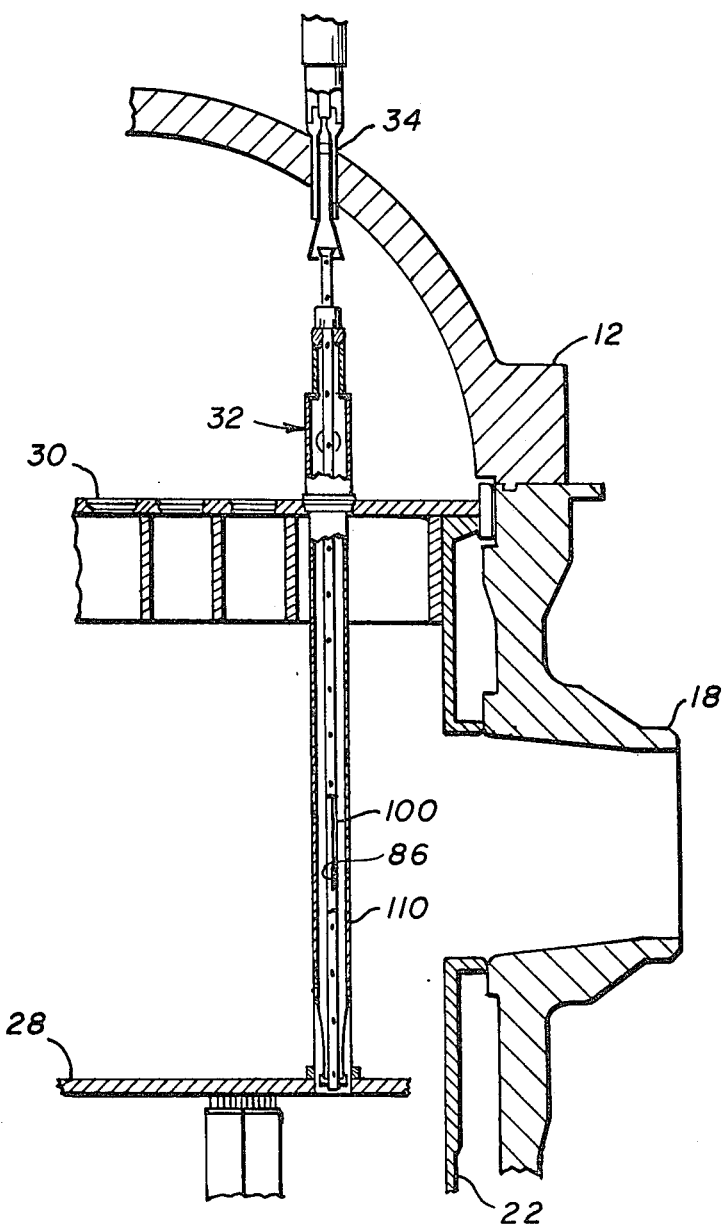
FIG. 2 is a fragmentary section of FIG. 1 showing a cutaway of one embodiment of the invention.

As shown in FIG. 2, heated junction thermocouple level measurement system 32 is mounted above fuel alignment plate 28. During normal operation of the pressurized water reactor, heated thermocouple junction level measurement system 32 is covered with and senses liquid coolant and the level is not particularly difficult to establish. During accidents which affect the level of coolant, the coolant in the reactor vessel 10 is not necessarily a subcooled liquid but rather may consist of a two-phase fluid. The two-phases are liquid and gas. When the coolant is water the liquid phase is water and the gaseous phase is steam. Steam bubbles rise to the top of the vessel due to buoyant forces thereby forming a steam region above a water level. Liquid level measurement in reactor vessel 10 is further complicated by the varying void fraction of the two-phase coolant.

FIG. 2 shows heated thermocouple junction level measurement system 32 mounted between the upper guide structure support plate 30 and fuel alignment plate 28. Electrical leads from heated junction thermocouple level measurement system 32, collectively conductors 48, 50, 52, 54 and 56, exit through vessel head 12 by way of seal plug 34. In this position, heated junction thermocouple level measurement system 32 monitors the level of coolant above the core. An embodiment of the axial spacing of sensors 36 has sensors equally spaced over the range of level sensing of heated junction thermocouple level measurement system 32. The sensors need not be equally spaced over the level sensing range.

Figure 3:
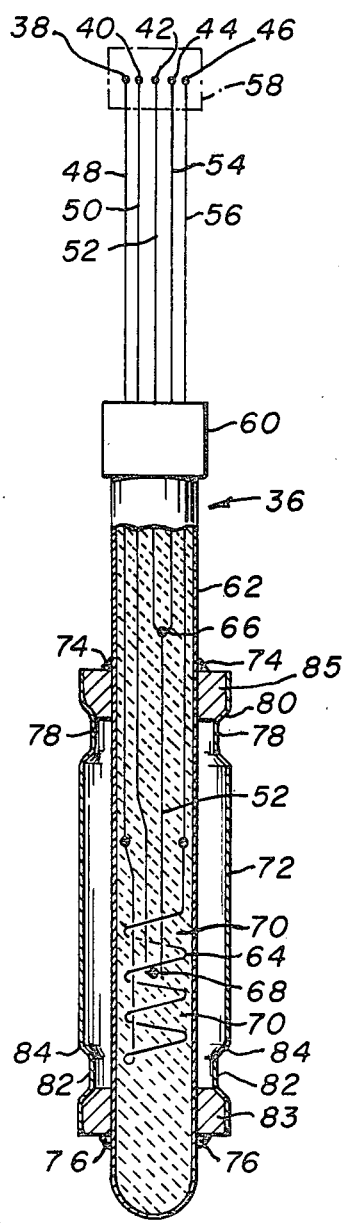
FIG. 3 is a vertical section of a heated junction thermocouple level measurement system.

FIG. 3 is a vertical section of a sensor 36. Pins 38, 40, 42, 44 and 46 connect to conductors 48, 50, 52, 54 and 56, respectively, in receptacle 58. Conductors 48, 50, 52, 54 and 56 further pass through seal plug 60 entering housing 62. Conductors 48 and 56 are copper leads to heater coil 64. A controllable power supply (not shown) is electrically connected to pins 38 and 46. Chromel conductor 54 and Alumel conductor 52 are joined within housing 62 to form unheated thermocouple junction 66. Alumel conductor 52 extends beyond unheated thermocouple junction 66 to within heater coil 64 and joins with Chromel conductor 50 forming heated thermocouple junction 68. Heated thermocouple junction 68 is located central to the 1 inch wound inconel heater 64. A thermally conductive and electrically insulating means such as ceramic insulating material 70 fills the housing through at least the length containing the thermocouple junctions. Unheated thermocouple junction 66 is located approximately 4.5 inches above heated thermocouple junction 68 so that there is substantially no effect by heat input from heater 64 on unheated thermocouple junction 66.

Unheated thermocouple junction 66 and heated thermocouple junction 68 are wired in series. The net voltage generated by thermocouple junctions 66 and 68 is a function of the temperature difference between the two thermocouple junctions. Heated thermocouple junction 68 will generate a voltage representative of its temperature. Unheated thermocouple junction 66 will also generate a voltage representative of its temperature. When the fluid surrounding housing 62 is liquid, heated thermocouple junction 68 remains at approximately the same temperature as unheated thermocouple junction 66 as the heat transfer from heater 64 through the thermally conductive and electrically insulating means 70 and housing 62 to the surrounding fluid is very good. The net voltage across pins 40 and 44 is approximately zero. When the fluid surrounding housing 62 is gaseous, the heat transfer from heater 64 through thermally conductive and electrically insulating means 70 and housing 62 to the gaseous fluid is not as good and the temperature of heated thermocouple junction 68 will rise above the temperature of unheated junction 66 producing a net voltage across pins 40 and 44 representative of the temperature difference between junctions 66 and 68. Thus, there will be a substantial difference in heat transfer between housing 62 and the surrounding fluid depending upon whether the coolant is liquid or gaseous. The differential temperature measurement between unheated thermocouple junction 66 and heated thermocouple junction 68 is used to indicate coolant level.

In addition to having available the net voltage generated by unheated thermocouple junction 66 and heated thermocouple junction 68, a voltage representative of the absolute temperature of both unheated junction 66 and heated junction 68 is available. The voltage representative of the temperature of unheated thermocouple junction 66 is available across pins 42 and 44. The voltage representative of the temperature of heated thermocouple junction 68 is available across pins 40 and 42.

The temperature of unheated thermocouple junction 66 indicates the temperature of the coolant in the reactor head region regardless of whether the coolant is water or steam. When supplied to an appropriate calculator, this coolant temperature can be utilized in the calculation of subcooled margin. Subcooled margin provides an indication of the margin to saturation conditions in the reactor coolant system.

Figure 4:
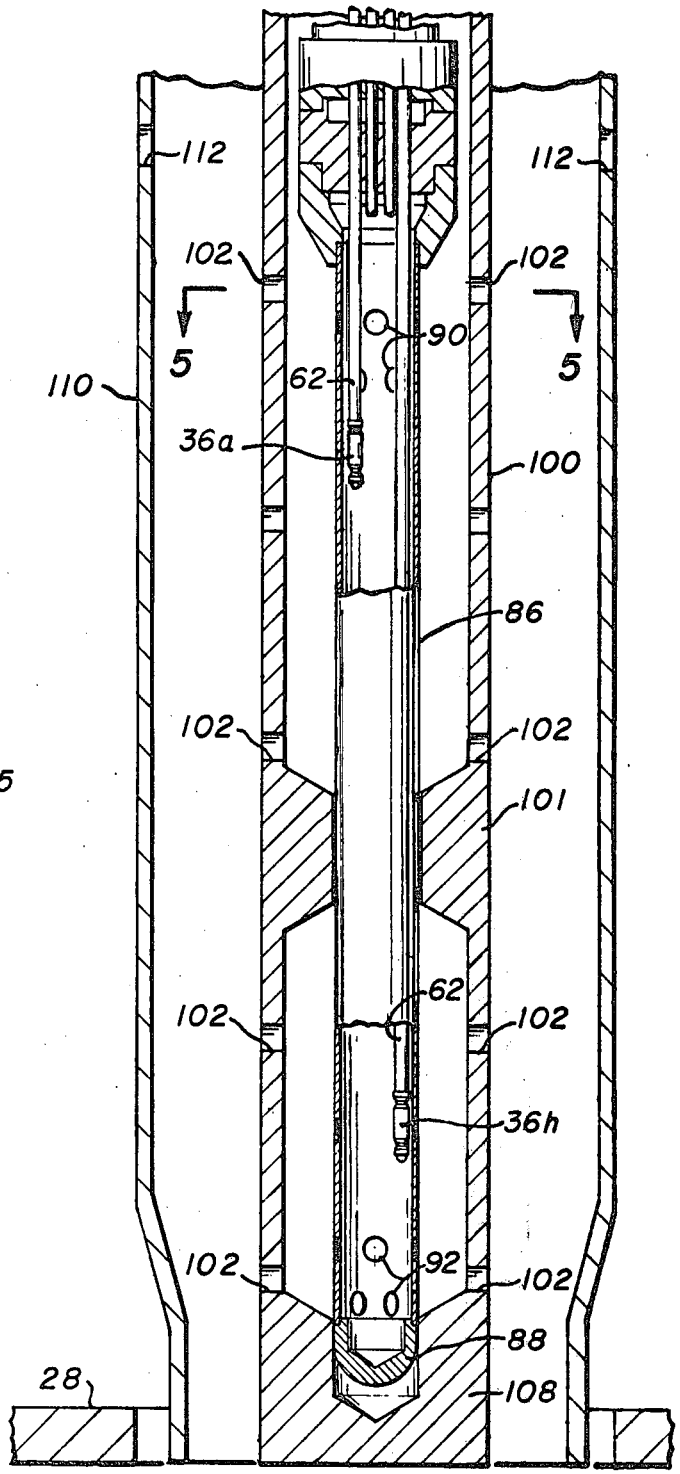
FIG. 4 is a vertical section through the heated junction thermocouple level measurement system.

The temperature of heated thermocouple junction 68 is used to control the power delivered to heater 64. The heater power controller 165 shown in FIG. 4 is designed to maintain a constant heater power sufficient to insure that a voltage signal is generated by heated thermocouple junction 68. To protect heater coil 64, heater power is reduced when the temperature of heated thermocouple junction 68 rises above a preselected value. There are two heater power controllers per channel. Each heater power controller controls the power delivered to four heater coils.

During testing it was found that liquid impinging on housing 62 in the region of heater 64 caused spurious cooling. It was further found that the effects of temperature decrease due to cooling were more rapid than the effects of temperature increase caused by heater 64. Since housing 62 could be cooled by spurious water droplets more rapidly than it could be heated by heater 64, it was imperative that spurious water droplets be kept off housing 62 in the region of heater 64 to obtain an accurate water level.

To overcome the effects of spurious water droplets, a 4 inch long stainless steel splash guard 72 was disposed to surround housing 62 in the region of heater 64. Splash guard 72 is joined to housing 62 by continuous weld or braze 74 at one end and continuous weld or braze 76 at the other end. Splash guard 72 is generally cylindrical with circumscribing recessed regions 80 and 84 near the top and bottom thereof. The portion of housing 62 disposed within splash guard 72 is in fluid communication with the coolant outside splash guard 72 through upper lateral inlet-outlet ports 78 in recessed region 80 and lower lateral inlet-outlet ports 82 in recessed region 84 as stainless steel plug 85 seals the upper end of splash guard 72 and stainless steel plug 83 seals the lower end of splash guard 72. Splash guard 72 acts as a stilling chamber to provide a nonturbulent interface between liquid and gaseous coolant surrounding housing 62 within the range of level sensed by sensor 36. Inlet-outlet ports 78 and 82 permit the coolant level within splash guard 72 to fluctuate with the coolant level outside splash guard 72. The fluid splashing outside splash guard 72 impinges on splash guard 72 thereby eliminating the spurious cooling effect experienced without splash guard 72. Should coolant splash or condense on housing 62 above splash guard 72 then run down housing 62 onto weld or braze 74, stainless steel plug 85 and splash guard 72, heated thermocouple junction 68 will not experience spurious temperature decreases. The lower surface of lower lateral inlet-outlet ports 82 are at the top of stainless steel plug 83 and allow virtually complete drainage of the volume within splash guard 72 when the liquid coolant level drops below inlet-outlet ports 82.

Upper lateral inlet-outlet ports 78 and lower lateral inlet-outlet ports 82 are multiple small ports sized to permit the coolant level inside splash guard 72 to respond to rapid changes in the level of coolant outside splash guard 72 within an acceptably short period of time. The number and size of inlet-outlet ports 78 and 82 will vary depending upon the volume enclosed by splash guard 72, the rate at which the coolant level outside splash guard 72 is expected to change and the time period acceptable for the level to equalize inside and outside splash guard 72. Generally the number and size of upper lateral inlet-outlet ports 78 are the same as the number and size of lower lateral inlet-outlet ports 82. In one application having a four inch long, three-eighths inch outside diameter splash guard, lateral inlet-outlet ports 78 and 82 were two in number, diametrically opposed across the splash guard and one-eighth inch in diameter. It was found that for a rapid coolant level change outside the splash guard the level inside the splash guard equalized in a fraction of the time required for the thermocouples to respond. Since inlet-outlet ports 78 and 82 are sized for a rapid change in coolant level and since a rapid change in coolant level is a worse case than a slower change in coolant level, inlet-outlet ports 78 and 82 function adequately for slower changes in coolant level.

It is not necessary to enclose unheated thermocouple junction 66 within splash guard 72 as unheated thermocouple junction 66 does not discriminate between liquid or gaseous fluid surrounding housing 62. When the fluid surrounding housing 62 is a two-phase fluid, the saturation temperature detected by unheated thermocouple junction 66 will be the same for both the liquid and gaseous phases. The unheated thermocouple junction thereby compensates for temperature changes in the coolant and no further temperature compensation is necessary in the heated junction thermocouple level measurement system 32.

FIG. 4 shows a vertical section through separator tube 86. Separator tube 86 encloses eight fixedly mounted sensors 36 and functions as a stilling chamber to hydraulically separate the two-phase fluid into a liquid phase and a gaseous phase. It is this liquid level that is measured by the heated junction thermocouple level measurement system 32. The level of liquid measured is indicative of the liquid inventory above the core.

Separator tube 86 is a tubular element with end 88 completely enclosed. End 88 prevents rising bubbles of steam from passing through the separator tube and disturbing the liquid-vapor interface thereby giving a flase indication of level. Lateral inlet-outlet ports 90 and 92 permit fluid communication between the volume enclosed by separator tube 86 and the volume within support tube 100. Upper lateral inlet-outlet ports 90 and lower lateral inlet-outlet ports 92 are multiple inlet-outlet ports sized to permit the coolant level inside separator tube 86 to respond to rapid changes in the level of coolant outside separator tube 86 within an acceptably short period of time. The number and size of inlet-outlet ports 90 and 92 will vary depending upon the volume enclosed by separator tube 86, the rate at which the coolant level outside separator tube 86 is expected to change and the time period acceptable for the level to equalize inside and outside separator tube 86.

Upper lateral inlet-outlet ports 90 permit fluid communication between the volume enclosed by separator tube 86 and the volume within support tube 100 at or above the level of inlet-outlet ports 78 of uppermost sensor 36a. Lower lateral inlet-outlet ports 92 permit fluid communication between the volume enclosed by separator tube 86 and the volume within support tube 100 at or below the level of inlet-outlet ports 82 of lowermost sensor 36h. Due to a decrease in pressure in reactor vessel 12 or a change in water level, water may pass through inlet-outlet ports 90 and 92 or water that has flashed to steam may pass through inlet-outlet ports 90 and 92 to equalize the water level inside and outside separator tube 86.

Heated junction thermocouple level measurement system 32 is mounted in the plenum above core 29 where coolant tends to move vertically and laterally toward outlet nozzle 18. In this location heated junction thermocouple level measurement system 32 is subjected to cross flow as the reactor coolant exits through nozzle 18. To prevent steam bubbles entrained in a two-phase fluid cross flow from entering lateral inlet-outlet ports 90 and 92 of separator tube 86, separator tube 86 is enclosed by and fixedly mounted in support tube 100. Support tube extension 101 supports but does not hydraulically seal against separator tube 86. Support tube 100 is a tubular element with end 108 completely enclosed. It is not necessary that end 108 be completely enclosed. Lateral inlet-outlet ports 102 are spaced throughout the length of support tube 100. Lateral inlet-outlet ports 102 are sufficient in size and number to permit the coolant level inside support tube 100 to respond to rapid changes in the level of coolant within reactor vessel 10 above the core within an acceptably short period of time. Lateral inlet-outlet ports 102 in the lower portion of support tube 100 are axially offset from lateral inlet-outlet ports 92 of separator tube 86 because at least the lower portion of heated junction thermocouple level measurement system 32 is subjected to crossflow. Lateral inlet-outlet ports 102 in the upper portion of support tube 100 may be axially offset from lateral inlet-outlet ports 90 of separator tube 86 depending upon the crossflow in this region in a particular application. In some applications, support tube 100 may be located in a generally cylindrical, otherwise unused, control element assembly shroud 110. Shroud 110 is a tubular element open on the bottom that has lateral inlet-outlet ports 112 at least near the top to permit liquid level fluctuations to equalize inside and outside shroud 110. Shroud 110 further prevents steam bubbles in the cross flow from disrupting the coolant level measured by heated junction thermocouple level measurement system 32 but is not necessary for heated junction thermocouple level measurement system 32 to function properly.

Figure 5:
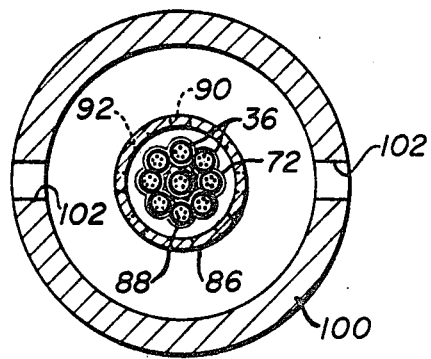
FIG. 5 is an enlarged top view of the heated junction thermocouple level measurement system showing one embodiment of the cross sectional arrangement of the eight sensors along the line 5—5 of FIG. 4.

One embodiment of the cross sectional spacing of sensors 36 within separator tube 86 and support tube 100 is shown in FIG. 5 taken through line 5—5 of FIG. 4. A uniform cross sectional spacing is used because it efficiently utilizes the space within separator tube 86; the cross sectional spacing of sensors 36 need not be uniform.

Figure 6:
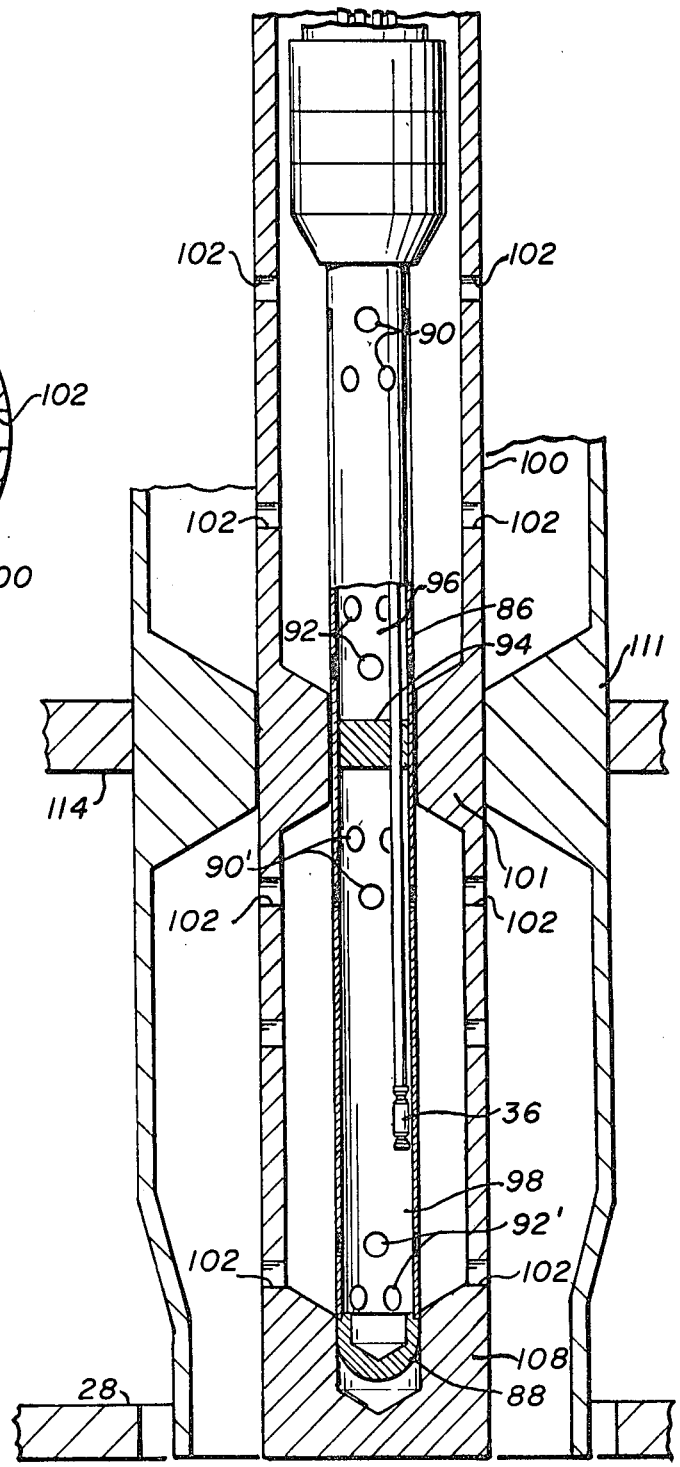
FIG. 6 is an alternate embodiment of the heated junction thermocouple level measurement system that permits measuring two liquid levels.

FIG. 6 shows an alternate embodiment of heated junction thermocouple level measurement system 32 in which hydraulic plug 94 divides the length of separator tube 86 into two level sensing sections 96 and 98 at the level of internal physical structure 114. This embodiment may be used when the internal physical structure 114 of the reactor could restrict coolant flow resulting in two liquid levels. Level sensing section 96 is above hydraulic plug 94 and internal physical structure 114 while level sensing section 98 is below hydraulic plug 94 and internal physical structure 114. Each level sensing section 96 and 96 has lateral inlet-outlet ports 90 or 90' at the top of the respective level sensing section and lower inlet-outlet ports 92 or 92' at the bottom of the respective level sensing section. Each level sensing section 96 and 98 contains at least one sensor 36 so that two separate liquid levels may be monitored. This concept can be extended to sense more than two liquid levels when the physical structure surrounding support tube 100 would impede the coolant flow.

When separator tube 86 is divided by hydraulic plug 94 to measure two liquid levels, it is necessary to similarly divide support tube 100 into two corresponding level measuring sections. Support tube extension 101 in this embodiment hydraulically seals against separator tube 100. The two level sensing sections remain 96 and 98. Upper level sensing section 96 has lateral inlet-outlet ports 102 in support tube 100 at least near the top and bottom thereof. Lower level sensing section 98 also has lateral inlet-outlet ports 102 at least near the top and bottom thereof. The level may equalize inside and outside level sensing sections 96 and 98 of support tube 100 through inlet-outlet ports 102. Inlet-outlet ports 102 are axially offset from lateral inlet ports 90, 90', 92 or 92' at least where support tube 100 is subjected to cross flow. In those applications where support tube 100 is located in shroud 110, shroud extension 111 hydraulically divides shroud 110 into the same level sensing sections 96 and 98.

Also during accident conditions, heated junction thermocouple level measurement system 32 can be used to detect the presence of noncondensable gas bubbles in the reactor vessel head, thereby providing information to the operator for use in controlling the reactor vent system.

In addition to being used during normal operation and accident conditions, the heated junction thermocouple level measurement system 32 can be used by the operator to determine if a recovery operation has been successful. Heated junction thermocouple level measurement system 32 can also be used to determine when sufficient reactor coolant has been removed from the primary system to permit refueling operations.

Heated junction thermocouple level measurement system 32 has in some applications been designed to be handled in the same manner as other top mounted in-core instrumentation devices during refueling operations and can be retrofitted into operating reactors and reactors under construction.

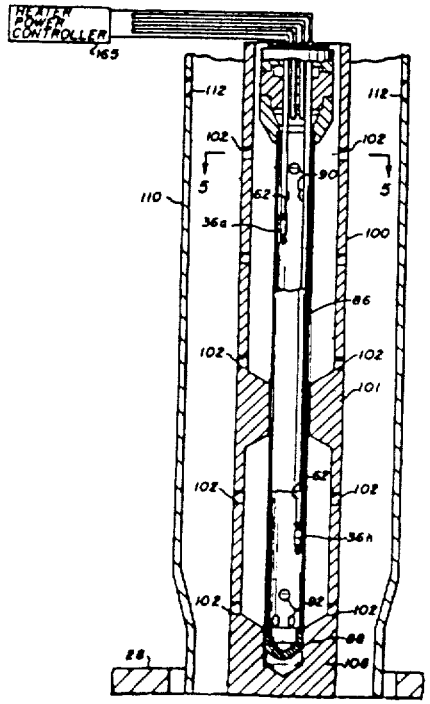

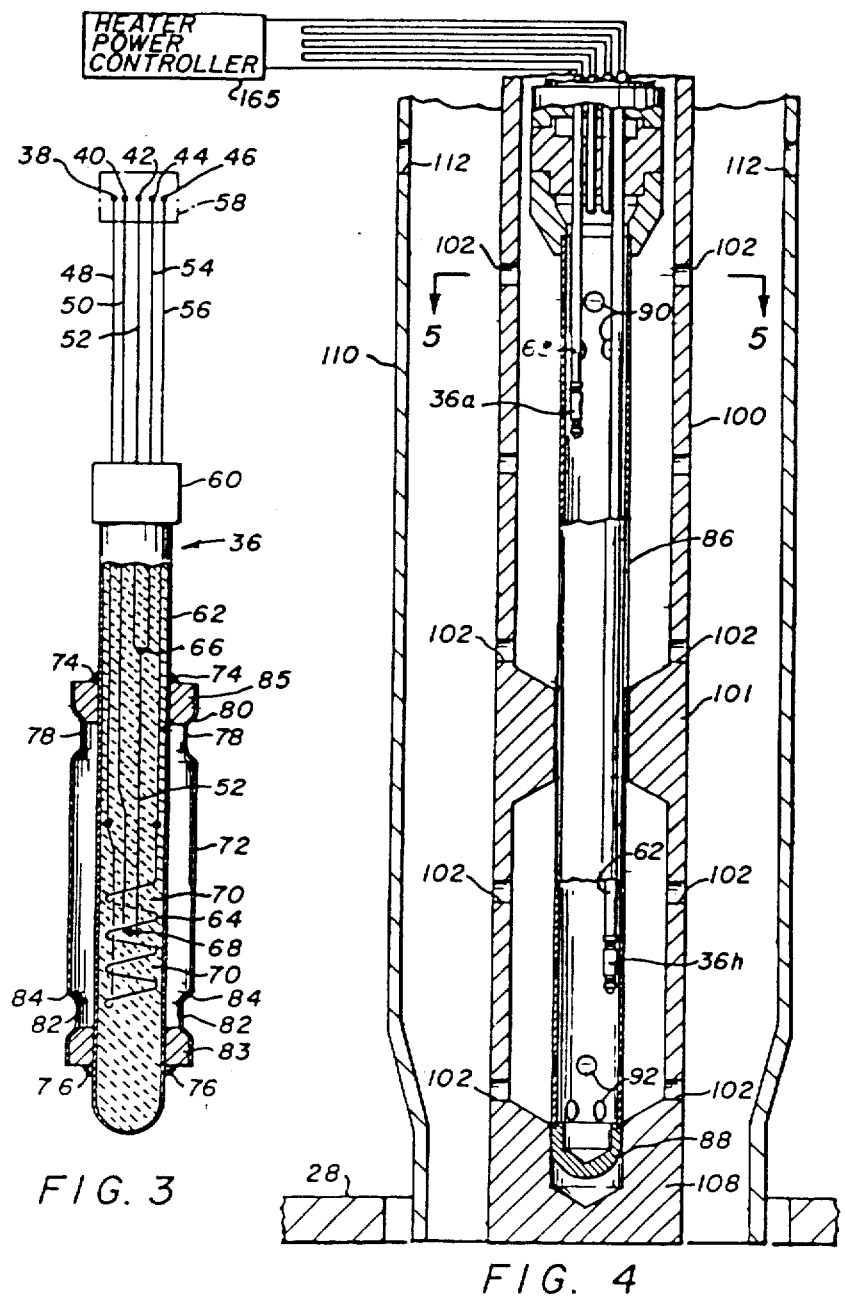

We claim:

1. An apparatus for sensing the level of a liquid contained within a pressure vessel comprising:
   a. a plurality of axially spaced elongated heat conductive housings, each of said housings having
      (1) a sensing portion located within said pressure vessel,
      (2) a heating element located within said sensing portion of said housing having an active length at least coextensive with the range of level to be sensed by said housing,
      (3) thermally conductive, electrically insulating means filling said housing at least through said active length of said heater,
      (4) a first thermocouple junction, said first thermocouple junction located within said sensing portion of said housing at a location that the heat flux from said heating element at said first thermocouple junction has a substantial effect on said first thermocouple,
      (5) a second thermocouple junction, said second thermocouple junction electrically and serially connected to said first thermocouple junction, said second thermocouple junction located within said sensing portion of said housing at a location sufficiently remote from said heating element that the heat flux from said heating element at said second thermocouple junction has substantially no effect on said second thermocouple junction,
      (6) a splash guard enclosing a volume, having an exterior and means for fluid communication between the volume enclosed by said splash guard and the exterior of said splash guard said splash guard enclosing a portion of said housing over at least the active length of said heating element;
   b. means for supplying energy to each of said heating elements;
   c. means for measuring the net voltage generated by each of said first thermocouple junctions and said second thermocouple junctions;
   d. a first tubular element having an interior, an exterior, an enclosed lower end, and means for fluid communication between said interior and said exterior said first tubular element surrounding said plurality of axially spaced elongated heat conductive housings and extending substantially the length of said housings, whereby liquid or liquid flashing to gas within said first tubular element exits through said fluid communicating means upon a pressure reduction or change in fluid level in said pressure vessel thereby maintaining equalized liquid levels on said interior and exterior of said first tubular element,
   e. a second tubular element having an interior, an exterior, and means for fluid communication between said interior and said exterior, said second tubular element surrounding said first tubular element, and extending substantially the length of said first tubular element; and
   f. at least a portion of said fluid communicating means between said interior and said exterior of said second tubular element are axially offset from said fluid communicating means between said interior and said exterior of said first tubular element.

2. An apparatus as in claim 1 wherein: said fluid communicatng means between said interior and said exterior of said first tubular element are lateral input-output ports near the top and bottom thereof.

3. An apparatus as in claim 2 wherein: said fluid communicating means between said volume enclosed by said splash guard and said exterior of said splash guard are lateral inlet-outlet ports near the top and bottom of said splash guard.

4. An apparatus as in claim 1, 2 or 3 also comprising means for sensing the absolute temperature of at least one of said first thermocouple junctions.

5. An apparatus as in claim 1, 2, or 3 also comprising:
means for sensing the absolute temperature of at least one of said second thermocouple junctions.

6. An apparatus as in claim 4 also comprising:
means for reducing power to at least one of said heaters when the temperature of at least one of corresponding said first thermocouples becomes excessive.

7. An apparatus of claim 1, 2 or 3 wherein: (a) said first tubular element is hydraulically divided forming at least two level sensing sections, each of said level sensing sections having said fluid communicating means between said interior and said exterior of said first tubular element and at least one elongated heat conductive housing, (b) said second tubular element is hydraulically divided proximate said hydraulic division in said first tubular element forming said at least two level sensing sections, each of said level sensing sections having said fluid communicating means between said interior and said exterior of said second tubular element, whereby at least two separate liquid levels may be measured.

8. An apparatus as in claim 7 also comprising: means for sensing the absolute temperature of at least one of said first thermocouple junctions.

9. An apparatus as in claim 7 also comprising: means for sensing the absolute temperature of at least one of said second thermocouple junctions.

* * * * *

UNITED STATES PATENT AND TRADEMARK OFFICE
CERTIFICATE OF CORRECTION

PATENT NO. : 4,440,717

DATED : April 3, 1984

INVENTOR(S) : Frank Bevilacqua et al.

It is certified that error appears in the above-identified patent and that said Letters Patent is hereby corrected as shown below:

The title page showing the illustrative figure should be deleted to appear as per attached title page.

The sheet of drawings consisting of Figs. 3 and 4, should appear as shown on the attached sheet.

Signed and Sealed this

Ninth Day of July 1985

[SEAL]

Attest:

DONALD J. QUIGG

Attesting Officer     Acting Commissioner of Patents and Trademarks

United States Patent [19]

Bevilacqua et al.

[11] 4,440,717
[45] Apr. 3, 1984

[54] HEATED JUNCTION THERMOCOUPLE LEVEL MEASUREMENT APPARATUS

[75] Inventors: Frank Bevilacqua, Windsor; Joseph M. Burger, Granby, both of Conn.

[73] Assignee: Combustion Engineering, Inc., Windsor, Conn.

[21] Appl. No.: 298,436

[22] Filed: Sep. 1, 1981

[51] Int. Cl.³ .................. G21C 17/00; G01F 23/72
[52] U.S. Cl. ........................... 376/247; 376/258; 73/295
[58] Field of Search .................. 376/247, 258; 73/295

[56] References Cited

U.S. PATENT DOCUMENTS

| | | | |
|---|---|---|---|
| 2,279,043 | 4/1942 | Harrington | 73/295 |
| 3,205,709 | 9/1965 | Gearing et al. | 73/295 |
| 3,279,252 | 10/1966 | Barlow | 73/295 |
| 3,280,627 | 10/1966 | Cousins et al. | 73/295 |
| 3,360,990 | 1/1968 | Greene et al. | 73/295 |
| 3,500,687 | 3/1970 | Smith | 73/295 |
| 3,905,243 | 9/1975 | Goldfuss | 73/295 |
| 3,964,311 | 6/1976 | Holmen | 73/295 |
| 4,320,656 | 3/1982 | Tiskus | 73/295 |

FOREIGN PATENT DOCUMENTS

| | | | |
|---|---|---|---|
| 1959041 | 5/1971 | Fed. Rep. of Germany | 73/295 |
| 2728582 | 1/1978 | Fed. Rep. of Germany | 73/295 |
| 820219 | 2/1961 | United Kingdom | 73/295 |
| 2022844 | 12/1979 | United Kingdom | 73/295 |

*Primary Examiner*—Sal Canglialosi
*Attorney, Agent, or Firm*—David L. Smith; William W. Habelt

[57] ABSTRACT

A liquid level sensing apparatus (32) senses the level of liquid surrounding the apparatus. A plurality of axially spaced sensors (36) are enclosed in a separator tube (86). The separator tube (86) tends to collapse the level of a two-phase fluid within the separator tube into essentially a liquid phase and a gaseous phase where the collapsed level bears a relationship to the coolant inventory outside the separator tube. The level of the liquid phase is sensed by level sensing apparatus (32). The separator tube (86) contains inlet-outlet ports (90,92) near the top and bottom thereof to equalize the liquid level inside and outside the separator tube (86) when the level fluctuates or the water within the separator tube (86) flashes to steam. Each sensor (36) is comprised of a heater (64), a heated thermocouple junction (68) and an unheated thermocouple junction (66) within an elongated heat conductive housing (62). The heated portion of housing (62) is enclosed in a splash guard (72) with inlet-outlet ports (78,82) near the top and bottom to equalize the liquid level inside and outside the splash guard (72) and to eliminate the spurious indications of liquid level change which may arise if water droplets contact the housing (62) in the region of the heater. To prevent steam bubbles entrained in a two-phase fluid cross flow from entering the lateral inlet-outlet ports (90,92) of the separator tube (86), the separator tube (86) is enclosed in support tube (100) which may in turn be enclosed in an otherwise unused control element assembly shroud (110). The lateral inlet-outlet ports (90,92) of separator tube (86) are axially offset from lateral inlet-outlet ports (102) of support tube 100 at least where support tube 100 is subjected to cross flow. The shroud (110) is open on the bottom and has lateral inlet-outlet ports (112) to facilitate liquid level fluctuations to equalize inside and outside shroud (110). An alternate embodiment permits the measurement of more than one liquid level.

9 Claims, 6 Drawing Figures